United States Patent [19]

Weitemeyer et al.

[11] Patent Number: 4,678,846

[45] Date of Patent: Jul. 7, 1987

[54] ACRYLATE OR METHACRYLATE-ESTER-MODIFIED ORGANOPOLYSILOXANE MIXTURES, THEIR PREPARATION AND USE AS ABHESIVE COATING COMPOSITIONS

[75] Inventors: Christian Weitemeyer, Essen; Jürgen Jachmann, Herne, both of Fed. Rep. of Germany

[73] Assignee: Th. Goldschmidt AG, Fed. Rep. of Germany

[21] Appl. No.: 755,281

[22] Filed: Jul. 15, 1985

[30] Foreign Application Priority Data

Jul. 14, 1984 [DE] Fed. Rep. of Germany ....... 3426087

[51] Int. Cl.$^4$ .................... C08L 83/07; C08F 230/08
[52] U.S. Cl. .................... 525/477; 522/99; 525/479; 528/26; 528/32; 528/33
[58] Field of Search .................. 525/477, 479; 528/26; 204/159.13; 522/99; 556/440

[56] References Cited

U.S. PATENT DOCUMENTS

| | | | |
|---|---|---|---|
| 3,577,264 | 5/1971 | Nordstrom | 525/479 |
| 4,201,808 | 5/1980 | Cully et al. | 525/479 |
| 4,301,268 | 11/1981 | Kropac | 525/479 |
| 4,477,548 | 10/1984 | Harasta et al. | 204/159.13 |

Primary Examiner—Wilbert J. Briggs, Sr.
Attorney, Agent, or Firm—Toren, McGeady & Associates

[57] ABSTRACT

Acrylate or methacrylate ester modified organopolysiloxane mixtures comprising essentially equilibrated organpolysiloxanes with, on the average, more than 25 to fewer than 200 silicon atoms and additionally containing 2 to 30 weight percent of organopolysiloxanes with, on the average, 2 to 25 silicon atoms, and 2 to 30 weight percent of organopolysiloxanes with, on the average, 200 to 2,000 silicon atoms, as well as processes for the preparation of mixtures of modified organopolysiloxanes of this composition. The inventive acrylate or methacrylate ester modified organopolysiloxane mixtures have excellent adhesion to metallic substrates and their surfaces exhibit good abhesive properties towards adhesives.

14 Claims, No Drawings

ACRYLATE OR METHACRYLATE-ESTER-MODIFIED ORGANOPOLYSILOXANE MIXTURES, THEIR PREPARATION AND USE AS ABHESIVE COATING COMPOSITIONS

BACKGROUND OF THE INVENTION

1. Field of the Invention

The invention relates to acrylate or methacrylate ester modified organopolysiloxane mixtures, their preparation and the use of these mixtures as abhesive coating compositions. The expression "(meth)acrylate esters" is intended to include acrylate, as well as the methacrylate esters.

2. Description of the Prior Art

German Pat. No. 27 47 233 discloses a process for the synthesis of acrylate or methacrylate ester modifified organopolysiloxanes by reacting (meth)acrylate esters having —COH groups with organopolysiloxanes having SiX groups (X=alkoxy, hydroxyl or chloro), optionally in the presence of catalysts. The organopolysiloxanes used have the formula

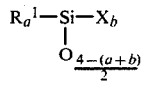

wherein
- $R^1$ is an alkyl group with 1 to 4 carbon atoms and/or a phenyl group,
- X is a chloro or $OR^2$ group,
- $R^2$ is an alkyl group with 1 to 4 carbon atoms and/or hydrogen,
- a has a value of 1.0 to 2.0,
- b has a value of 0.02 to 1.6, and
- a+b is not greater than 2.66, and wherein the siloxane molecule has 3 to 100 silicon atoms and pentaerythritol tri(meth)acrylate is employed as the methacrylate ester, the pentaerythritol ester being used in an amount of 0.05 molar to equimolar amounts relative to the COH- and SiX-groups.

After the addition of known initiators, these compounds can be cured in a very short time by UV radiation. The curing time generally is less than one second. These compounds can therefore be used, for example, as a vehicle or a vehicle additive for printing inks. Such printing inks can be fixed on the support by UV radiation and exhibit hydrophobic properties, which is of special importance for printing inks whose hydrophobicity is to be utilized technically.

The compounds can, however, also be used for the preparation of lacquer vehicles or other coating materials, such as, for example, as basic materials or additives for coating paper, wood or metal surfaces. Here also, the curing time, which is frequently reduced to fractions of a second, is of special technological importance.

German Pat. No. 27 47 233 discloses that other curable unsaturated compounds, which are capable of copolymerizing, may be added to these compounds in order to influence the properties and/or to lower the costs of the systems.

German Offenlegungsschrift No. 29 48 708 discloses a process for synthesizing organopolysiloxanes which are suitable for use as active ingredients in abhesive coating compositions for two-dimensional carriers, and especially, for paper or plastic films. The synthesis is carried out by reacting organopolysiloxanes which have SiCl groups with pentaerythritol triacrylate or pentaerythritol trimethacrylate, optionally with the addition of neutralizing agents that bind hydrogen chloride.

This process has the following principal characteristics:

(a) the organpolysiloxane used has the formula

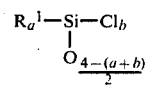

in which
- $R^1$ is an alkyl group with 1 to 4 carbon atoms, a vinyl and/or a phenyl group, with the proviso that at least 90 mole percent of the $R^1$ groups are methyl groups,
- a has a value of 1.8 to 2.2, and
- b has a value of 0.004 to 0.5;

(b) the reaction is carried out with at least equimolar amounts of pentaerythritol triacrylate or pentaerythritol trimethacrylate; and (c) the product of the process is separated by known procedures from solid components suspended in it.

This process may be modified by initially reacting the organochlorosilanes with, based on the SiCl groups, at least twice the molar amount of a dialkylamine, the alkyl groups of which, in each case, have 3 to 5 carbon atoms, the carbon atom adjacent the nitrogen carrying at most one hydrogen atom. The reaction product is then allowed to react with pentaerythritol triacrylate or pentaerythritol trimethacrylate.

These compounds can also be used as coating compositions and cured by UV radiation in the presence of radical initiators. The compounds possess abhesive properties after curing.

In practice, however, it has turned out that these known acrylate or methacrylate modified organopolysiloxanes do not fulfill all the requirements needed for their practical application. In particular, it is desirable to increase the adhesion of the resins to the substrate and, at the same time, to improve the abhesive surface properties. After being fully cured, these compounds should be particularly abhesive towards adhesives so that the resins are suitable especially for coating papers, to which, for example, labels are detachably adhered.

SUMMARY OF THE INVENTION

We have discovered that this combination of properties is to be found in acrylate or methacrylate ester modified organopolysiloxane mixtures which have a particular molecular weight distribution. In deviation from a molecular weight distribution corresponding to equilibration, the compounds must have specific contents of low and high molecular weight portions. This molecular weight distribution can be defined by the average number of silicon atoms of the individual compounds contained in the organopolysiloxane mixture.

More particularly, the compounds of the present invention comprise (meth)acrylate ester modified organopolysiloxane mixtures, comprising essentially equilibrated organopolysiloxanes with, on the average, more than 25 to fewer than 200 silicon atoms and which additionally contain 2 to 30 weight percent of organopolysiloxanes with, on the average, 2 to 25 silicon atoms and 2 to 30 weight percent of organopoly-siloxanes with, on the average, 200 to 2,000 silicon atoms.

As used herein, the organopolysiloxane fractions having more than 25 to less than 200 silicon atoms are sometimes referred to as the first fraction, those having 2 to 25 silicon atoms are referred to as the second fraction, and those having 200 to 2,000 silicon atoms are referred to as the third fraction.

Especially preferred are those (meth)acrylate ester modified organopolysiloxane mixtures which contain, besides the essentially equilibrated organopolysiloxane with, on the average, more than 25 to fewer than 200 silicon atoms, 5 to 20 weight percent of organopolysiloxanes with, on the average, 5 to 25 silicon atoms and 5 to 20 weight percent of organopolysiloxanes with, on the average, 200 to 2,000 silicon atoms.

DESCRIPTION OF THE PREFERRED EMBODIMENTS

The organopolysiloxanes contained in the organopolysiloxane mixtures preferably correspond to the formula:

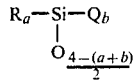

in which R is an alkyl radical with 1 to 4 carbon atoms, preferably, the methyl radical. R may, however, also be a vinyl or phenyl radical. Moreover, the R radical may also represent different moieties in the molecule, so that some R radicals represent methyl radicals and the other R radicals may, for example, represent a vinyl or a phenyl radical. Preferably, at least 90% of the R radicals are alkyl radicals, especially methyl radicals.

Q is an organic radical which contains the acrylate or methacrylate ester groups. Preferably, the acrylate or methacrylate ester radical is linked to the silicon atom through an SiOC bridge. The acrylate or methacrylate radical may moreover be derived from pentaerythritol triacrylate, pentaerythritol trimethacrylate, dipentaerythritol pentaacrylate, dipentaerythritol pentamethacrylate, ditrimethylolpropane triacrylate, ditrimethylolpropane trimethacrylate, ditrimethylolethane triacrylate, ditrimethylolethane trimethacrylate, trimethylolpropane di(meth)acrylate, trimethylolethane di(meth)acrylate, glycerin di(meth)acrylate, hydroxyethyl acrylate, hydroxypropyl acrylate and neopentyl glycol monoacrylate.

The acrylate or methacrylate ester radical may, however, also be linked through an SiC bridge with the organopolysiloxane.

a has a value of 1.0 to 2.2; b has a value of 0.001 to 1.6.

The fractions of different average molecular weight, contained in the inventive acrylate or methacrylate ester modified organopolysiloxane mixtures may differ in respect to the R and Q radicals and the a and b subscripts.

It has turned out that the adhesion of the organopolysiloxanes to a substrate is improved by the content of relatively low molecular weight portions while the abhesiveness of the modified siloxanes increases with the increase in the content of high molecular weight portions. In order to achieve the desired combination of properties, it is however necessary that the three fractions which differ in respect to their molecular weights, be present together. The desired combination of properties is not obtained when one of the three fractions is not present in the organopolysiloxane mixture in the given amount.

The inventive acrylate or methacrylate ester modified organopolysiloxane mixtures can be prepared according to processes known from the state of the art. In this connection, the procedure described in German Pat. No. 27 47 233 is preferred. The preferred process is one wherein organopolysiloxanes of the formula

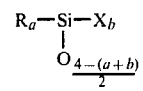

in which
R is an alkyl radical with 1 to 4 carbon atoms, a vinyl radical or a phenyl radical,
X is a hydrolyzable radical or a hydroxyl radical,
a has a value of 1.0 to 2.2, and
b has a value of 0.001 to 1.6, is reacted with hydroxyl group containing acrylate or methacrylate esters, preferably in equimolar amounts based on the COH and SiX groups, and wherein either (a) organopolysiloxane mixtures are used which contain essentially equilibrated organopolysiloxanes with, on the average, more than 25 and less than 200 silicon atoms, and in addition, lower molecular weight organopoly-siloxanes with, on the average, 2 to 25 silicon atoms and higher molecular weight organopolysiloxanes with, on the average, 200 to 2,000 silicon atoms, in such amounts that, after the reaction with the acrylate or methacrylate esters, the lower molecular weight and the higher molecular weight modified organopolysiloxanes, in each case, are present in amounts of 2 to 30 weight percent, based on the total weight, and (b) the low, medium and high molecular weight organopoly-siloxanes are reacted separately and the reaction products are mixed in the required weight ratios.

In the first version of the process, the reaction is carried out with an organopolysiloxane mixture, which already has the desired molecular weight distribution. Since this distribution differs from the statistical distribution obtained by equilibration, it is necessary to synthesize the individual organopolysiloxane fractions separately and to mix them in the desired ratios. According to the first version of the process, this mixture is reacted with acrylate or methacrylate esters having hydroxyl groups, such as, for example, pentaerythritol triacrylate, pentaerythritol trimethacrylate, dipentaerythritol pentaacrylate, or dipentaerythritol pentamethacrylate. The reaction is preferably carried out in equimolar amounts, based on the COH- and SiX-groups. The amounts of reactants can, however, also be chosen in such a manner, that 0.7 to 0.99 SiX-groups correspond to one COH-group.

In the second version of the inventive process, the individual organopolysiloxane fractions are reacted separately with the acrylate or methacrylate esters in a known manner and the respective reaction products are mixed in the required weight ratios. In either case, the same advantageous combination of properties is obtained.

The inventive organopolysiloxanes can be used by themselves or in admixture with other unsaturated compounds capable of copolymerizing, such as, for example, monomeric, oligomeric or polymeric epoxy esters, or urethane acrylates and methacrylates, esters of unsaturated dicarboxylic acids, allyl esters, as well as other vinyl-type compounds, such as, vinyl aromatics or vinyl lactams.

When curing with ultraviolet radiation, it is necessary to add a radical initiator to these mixtures, preferably in amounts of 1 to 10 weight percent based on the modified siloxane. The choice of radical initiator depends on the wave length spectrum of the UV radiation source used for the curing. Such radical initiators are known. Compounds, such as, benzophenone, its oxime or benzoin ether, and other compounds known to function as initiators under these conditions may be used. If no initiators are added, the inventive organopolysiloxanes can be cured, for example, by laser light, electron beams or γ-rays.

It is possible to modify the coating compositions so obtained by the addition of other products. Such modifying agents are, for example, siloxanes with groups which are incorporated chemically into coating compositions as the latter is cured. Particularly suitable modifying agents are siloxanes with hydrogen atoms linked to silicon atoms. These can bring about changes, such as a lowering of the viscosity of the coating compositions, as a result of which it becomes easier to apply the compositions on two dimensional carriers. The amount added depends on the effect desired and usually falls within the range of 5 to 40 weight percent, based on the modified siloxane.

Other modifying agents which may be used are mentioned in German Auslegeschrift No. 26 02 809 and German Offenlegungsschrift No. 32 18 675.

Moreover, it is also possible to add solids in order to change the viscosity or the surface. These solids include especially microdispersed silica or organic fluorohydrocarbon polymers and the like.

The preparation of the inventive compounds is explained in greater detail, using the preparation of organopolysiloxanes modified with pentaerythritol triacrylate as an example.

Diisopropylamine (1.1 moles) is added to an amount of toluene, which will lead to an approximately 40% solution of the end product. The desired chlorosilane (1 equivalent) is then added dropwise at 70° C. and the mixture is stirred for 1 hour at this temperature. Subsequently, 0.5 g of copper powder are added as inhibitor. Pentaerythritol triacrylate (1 mole) is then added dropwise, after which stirring is continued for 40 minutes. The precipitate formed is filtered off and the filtrate is mixed once again with 0.5 g of copper powder. The solvent is evaporated off under the vacuum of a water-jet pump up to a maximum flask temperature of 80° C. Finally, the product is filtered under pressure through a filter press.

The following viscosities are obtained for products from α,ω-dichlorodimethylpolysiloxanes which contain the average number of silicon atoms per molecule given below:

| | | |
|---|---|---|
| 10 Si atoms | 397 mPas | modified siloxane I |
| 120 Si atoms | 1,483 mPas | modified siloxane II |
| 400 Si atoms | 12,100 mPas | modified siloxane III. |

The viscosity of a mixture of these products in the ratio of 1:8:1 is 1675 mPas (process b).

A 1:12.6:1.6 mixture of α,ω-dichlorodimethyl polysiloxanes having 10, 120, and 400 silicon atoms, respectively, in the average molecule gives a product with a viscosity of 1710 mPas (process a) after being reacted with pentaerythritol triacrylate according to the above procedure.

In order to check their application properties, the modified siloxanes I, II and II are compared individually and in the form of their mixtures A to F, as well as in the form of a mixture of modified siloxanes G, prepared by the method described in version (a) hereinabove For this purpose, the preparations I, II, III and A to G are applied to supercalendered paper and cured with an electron beam at 1.5 Mrad. The amount applied is about 1.1 g/m². As test adhesives X, Y and Z, an acrylate adhesive tape and a rubber adhesive tape, as well as an aqueous acrylate dispersion are used, which after drying, are covered with label paper. Then, after 24 hours storage at 70° C., 3 cm wide strips are pulled off and the force in N required for this, is determined. In addition, the adhesion to the substrate is tested by vigorous rubbing with the thumb. If the adhesion is deficient, rubber-like crumbs are formed. This is the so-called rub-off test.

TABLE

| Modified Siloxane | Average Number of Si Atoms in the Polysiloxane | | | Test Adhesive | | | Rub off | Remarks |
|---|---|---|---|---|---|---|---|---|
| | 10 | 120 | 400 | X | Y | Z | | |
| I | 100 wt. % | — | — | 3.5 | 3.5 | 3.5 | no | paper tears |
| II | — | 100 wt. % | — | 0.25 | 0.7 | 0.55 | yes | |
| III | — | — | 100 wt. % | 0 | 0 | 0 | — | not fully cured |
| A | 5 wt. % | 95 wt. % | — | 0.25 | 0.75 | 0.6 | no | |
| B | — | 95 wt. % | 5 wt. % | 0.15 | 0.6 | 0.5 | yes | |
| C* | 5 wt. % | 90 wt. % | 5 wt. % | 0.15 | 0.6 | 0.55 | no | |
| D* | 10 wt. % | 80 wt. % | 10 wt. % | 0.05 | 0.45 | 0.3 | no | |
| E* | 20 wt. % | 60 wt. % | 20 wt. % | 0.05 | 0.4 | 0.35 | no | |
| F | 40 wt. % | 20 wt. % | 40 wt. % | 0 | 0 | 0 | — | not fully cured |
| G* | 10 wt. % | 80 wt. % | 10 wt. % | 0.05 | 0.45 | 0.3 | no | |

*according to the invention

It can be seen from the table that the organopolysiloxanes modified with acrylate esters provide coating compositions having the desired combination of properties only, if their composition corresponds to that specified in the present invention (mixtures C, D, E and G). If the content of the low molecular weight is too low, adhesion to the substrate is deficient. If the high molecular weight component is missing in the mixture, the abhesiveness of the mixture is inadequate. If the content of low molecular weight and high molecular weight components is too high, the mixture is not cured fully under the given conditions.

We claim:

1. Mixtures of compounds which are acrylate or methacrylate ester modified organopolysiloxane mixtures with improved adhesive properties comprising a mixture of essentially equilibrated organopolysiloxanes with, on the average, a first fraction containing more than 25 to less than 200 silicon atoms, and 2 to 30 weight percent of a second fraction of organopolysiloxanes with, on the average, 2 to 25 silicon atoms, and 2 to 30 weight percent of a third fraction of organopolysiloxanes with, on the average 200 to 2,000 silicon atoms.

2. The mixture of claim 1 which contains 5 to 20 weight percent of organopolysiloxanes with, on the average, 5 to 25 silicon atoms and 5 to 20 weight percent of organopolysiloxanes with, on the average, 200 to 2,000 silicon atoms 3. The mixture of claim 1 or 2 wherein the organopolysiloxanes in the mixture have the formula

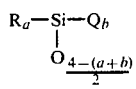

wherein
R is alkyl with 1 to 4 carbon atoms, vinyl, or phenyl,
Q is an organic radical containing acrylate or methacrylate groups, linked directly to the silicon atom through an SiOC-bridge or through an SiC-bridge,
a is from 1.0 to 2.2, and
b is from 0.001 to 1.6.

4. The mixture of claim 3 wherein the acrylate or methacrylate radical is obtained from an ester selected from the group consisting of pentaerythritol triacrylate, pentaerythritol trimethacrylate, dipentaerythritol pentaacrylate, dipentaerythritol pentamethacrylate, ditrimethylolpropane triacrylate, ditrimethylolpropane trimethacrylate, ditrimethylolethane triacrylate, ditrimethylolethane trimethacrylate, trimethylolpropane diacrylate, trimethylolpropane dimethacrylate, trimethylolethane diacrylate, trimethylolethane dimethacrylate, glycerin diacrylate, glycerin dimethacrylate, hydroxyethyl acrylate, hydroxypropyl acrylate and neopentyl glycol monoacrylate.

5. The mixture of claim 3 wherein R is methyl.

6. The mixture of claim 3 wherein at least 90 percent of the R radicals are alkyl radicals.

7. The mixture of claim 3 wherein at least 90 percent of the R radicals are methyl radicals.

8. A process for the preparation of the mixture of claim 1 which comprises reacting a hydroxy group containing acrylate or methacrylate ester with a mixture of essentially equilibrated organopolysiloxanes, the organopolysiloxanes having the formula

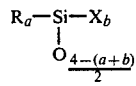

in which
R is an alkyl radical with 1 to 4 carbon atoms, a vinyl radical or a phenyl radical,
X is a hydrolyzable radical or a hydroxyl radical,
a has a value of 1.0 to 2.2, and
b has a value of 0.001 to 1.6,
and wherein the mixture is composed of a first fraction of organopolysiloxanes having, on the average, more than 25 and less than 200 silicon atoms, a second fraction having on the average 2 to 25 silicon atoms, and a third fraction having, on the average, 200 to 2,000 silicon atoms, the amount of the fractions being such that, after the reaction, the low and high molecular weight fractions of the resulting modified organopolysiloxane are each present in amounts of 2 to 30 weight percent based on the total weight of the mixture.

9. The process of claim 8 wherein the second fraction contains, on the average, 5 to 25 silicon atoms and the amounts of the fractions are such that, after the reaction, the second and third fractions of the resulting modified organopolysiloxane are each present in amounts of 5 to 20 weight percent.

10. A process for the preparation of the mixture of claim 1 or 2 which comprises:
(a) reacting a hydroxy group containing acrylate or methacrylate ester with a first fraction of organopolysiloxanes having, on the average, more than 25 and less than 200 silicon atoms;
(b) reacting a hydroxy group containing acrylate or methacrylate ester with a second fraction of organopolysiloxanes having, on the average, 2 to 25 silicon atoms;
(c) reacting a hydroxy group containing acrylate or methacrylate ester with a third fraction of organopolysiloxanes having, on the average, 200 to 2,000 silicon atoms; and
(d) mixing the products from steps a), b), and c), such that the final mixture products from steps b) and c) are each present in amounts of from 2 to 30 weight percent, based on the total weight of the mixture.

11. The process of claim 8 wherein the acrylate or methacrylate ester is selected from the group consisting of pentaerythritol triacrylate, pentaerythritol trimethacrylate, dipentaerythritol pentaacrylate, dipentaerythritol pentamethacrylate, ditrimethylolpropane triacrylate, ditrimethylolpropane trimethacrylate, ditrimethylolethane triacrylate, ditrimethylolethane trimethacrylate, trimethylolpropane diacrylate, trimethylolpropane dimethacrylate, trimethylolethane diacrylate, trimethylolethane dimethacrylate, glycerin diacrylate, glycerin dimethacrylate, hydroxyethyl acrylate, hydroxypropyl acrylate and neopentyl glycol monoacrylate.

12. An abhesive coating composition containing an abhesive effective amount of the mixture of claim 1 or 2.

13. The composition of claim 12 which further comprises an unsaturated compound selected from the group consisting of monomeric, oligomeric, and polymeric expoxy esters, or urethane acrylates and methacrylates, esters of unsaturated dicarboxylic acids, alkyl esters, vinyl aromatics and vinyl lactams.

14. The process of claim 10 wherein the acrylate or methacrylate ester is selected from the group consisting of pentaerythritol triacrylate, pentaerythritol trimethacrylate, dipentaerythritol pentaacrylate, dipentaerythritol pentamethacrylate, ditrimethylolpropane triacrylate, ditrimethylolpropane trimethacrylate, ditrimethylolethane triacrylate, ditrimethylolethane trimethacrylate, trimethylolpropane diacrylate, trimethylolpropane dimethacrylate, trimethylolethane diacrylate, trimethylolethane dimethacrylate, glycerin diacrylate, glycerin dimethacrylate, hydroxyethyl acrylate, hydroxypropyl acrylate and neopentyl glycol monoacrylate.

* * * * *